Dec. 11, 1973  G. L. DRISCOLL ET AL  3,778,487
POLYISOBUTYLENE OIL HAVING A HIGH VISCOSITY INDEX
Filed July 6, 1970  7 Sheets-Sheet 1

GARY L. DRISCOLL
IRL N. DULING
DAVID S. GATES
INVENTORS

ATTORNEY

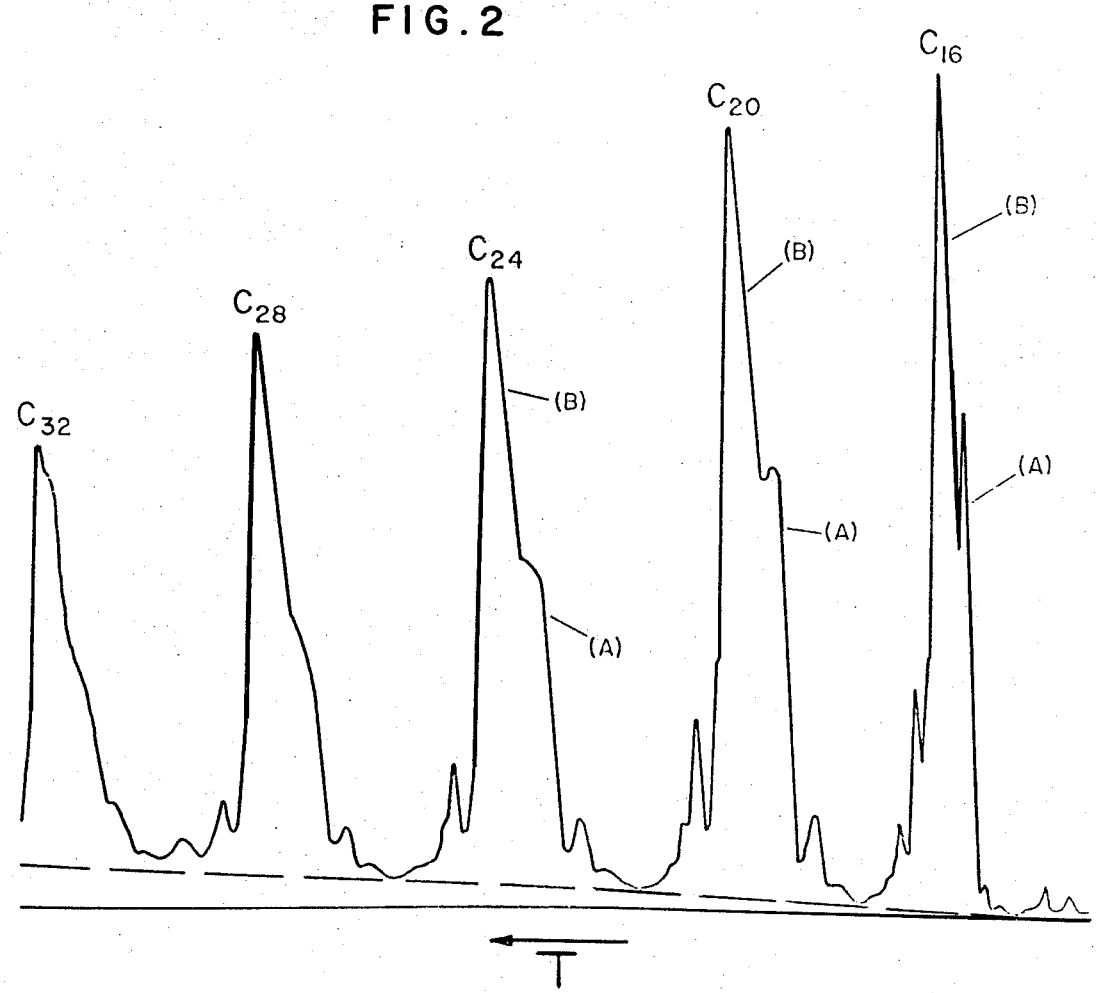

```
   KV₂₁₀    9.38
   KV₁₀₀    114.0
  VTF-VI    41
 ASTM-VI    49
```

GARY L. DRISCOLL
IRL N. DULING
DAVID S. GATES
INVENTORS

KV$_{210}$ 5.08
KV$_{100}$ 33.47
VTF-VI 76
ASTM-VI 73

```
   KV₂₁₀    4.56
   KV₁₀₀   29.58
  VTF-VI    64
 ASTM-VI    57
```

United States Patent Office 3,778,487
Patented Dec. 11, 1973

3,778,487
POLYISOBUTYLENE OIL HAVING A HIGH VISCOSITY INDEX
Gary L. Driscoll, Boothwyn, Irl N. Duling, West Chester, and David S. Gates, Swarthmore, Pa., assignors to Sun Research and Development Co., Philadelphia, Pa.
Filed July 6, 1970, Ser. No. 52,301
Int. Cl. C07c 9/00
U.S. Cl. 260—676 R     14 Claims

ABSTRACT OF THE DISCLOSURE

Novel polyolefin oils of monomers of the formula

wherein R is —$CH_3$ and —$C_2H_5$ and $R_1$ is an alkyl group of from 1 to 10 carbon atoms, have exceptionally high viscosity indices and high coefficients of traction and consists essentially of unisomerized, true oligomer, such as true polyisobutylene oligomers (e.g. $C_{16}H_{32}$, $C_{20}H_{40}$, $C_{24}H_{48}$ ... $C_{48}H_{96}$). The novel oils are useful as electrical oils, as chemical intermediates or as tractants (i.e. as traction fluids or as components of traction fluids). The hydrogenated oils are novel and especially useful as tractants, particularly when hydrogenated to a bromine number less than 10 (more preferably, less than 5). The unique character of these novel oils, whether olefine and/or paraffin, can be proved by a combination of gas chromatography and nuclear magnetic resonance spectroscopy (NMR). These olefins, and the paraffins produced by hydrogenation thereof are characterized by "crowded" and sterically hindered geminal methyl and isolated methylene groups. The individual species in the range of $C_{16}$ to $C_{48}$ can be separated from the whole oil by vapor phase chromatography. One such novel polyolefin oil having an ASTM viscosity index greater than 85, consists essentially of monoolefins of carbon numbers, $C_{24}$, $C_{28}$, $C_{32}$, $C_{36}$ and $C_{40}$ and having repeating isobutylene structures.

more adamantane nuclei, of hydrogenated oils, of saturated cyclic hydrocarbon oils or of branched chain acyclic hydrocarbon oils and to the blending of hydrocarbon components to produce traction fluids.

BACKGROUND AND SUMMARY OF THE INVENTION

Oligomers and high molecular weight polymers of isobutylene have been prepared commercially for a number of years (e.g. see R. H. Dyer, Symposium of Polybutene Oils, presented at a Special Session of Insulations Subcommittee (No. 5) IEEE Insulated Conductors Committee Meeting, Boston, Mass., Nov. 17, 1964). Prior art polyisobutylene oils (prepared by Lewis acid catalysis) have ASTM viscosity indices (VI's) ranging from 40–80 depending on the temperature of polymerization, feed stocks and fractionation. The low VI's of these fluids rise from side reactions and possibly isomerization which occurs during the polymerization reaction. When linear unisomerized polyisobutylene oligomers were prepared by thermal cracking of high molecular weight polymers (see Ser. No. 679,833), it was found that these "Duling-Gates oils" had VI's ranging from 95–115.

In the past polymers of isobutene and other oils have been produced using catalyst systems based on such strong Lewis acids as aluminum chloride and boron trifluoride. These systems are severe in nature and produce oils having a nearly continuous spectrum of numbers of carbon atoms and isomeric structures. In general, and apparently due to this wide spectrum of isomeric structures in the various individual oil molecules, these processes produce oils having a relatively low viscosity index. For instance, in the case of isobutene these processes are unable to produce an oil consisting essentially of olefin hydrocarbons in the $C_{24-40}$ range and having a viscosity index above 85. For many applications, including the use of these oils as a traction fluid or traction fluid component, a high viscosity index is desirable due to the variety of temperatures which may be encountered.

The above-referred to U.S. Pat. 3,595,796 of Duling and Gates, disclosed that novel fluids prepared by

CROSS REFERENCES TO RELATED APPLICATIONS

| Serial No. | Filing date | Title/inventor(s) |
|---|---|---|
| 621,443 (now abandoned) | 3-8-67 | Synthetic Lubricants from Low Molecular Weight Olefins—Richard S. Sterans, Irl N. Duling, and David S. Gates. |
| 679,801 (now U.S. 3,597,358, issued 8-3-71) | 11-1-67 | Traction Drive Transmission Containing Adamantane Compounds as Lubricant— Irl N. Duling, David S. Gates, and Robert E. Moore. |
| 679,833 (now U.S. 3,595,796, issued 7-27-71) | 11-1-67 | Traction Drive Transmission Containing Naphthenes, Branched Paraffins, or Blends of Naphthenes and Branched Paraffins as Lubricant—Irl N. Duling, David S. Gates, and Frederick P. Glazier. |
| 679,834 (now U.S. 3,595,797, issued 7-27-71) | 11-1-67 | Blending Branched Paraffin Fluids for Use in Traction Drive Transmission—Irl N. Duling, David S. Gates, and Marcus W. Haseltine. |
| 679,851 (now U.S. 3,598,740, issued 8-10-71) | 11-1-67 | Traction Drive Transmission Containing Paraffinic Oil as Lubricant—Irl N. Duling, David S. Gates, and Thomas D. Newingham. |
| 784,487 (now U.S. 3,646,224, issued 2-29-72) | 12-17-68 | Conversion of Adamantane Hydrocarbons to Monools—Robert E. Moore. |
| 794,844 (now U.S. 3,608,385, issued 9-28-71) | 1-24-69 | Friction Drive Fluid—Irl N. Duling and Frederick P. Glazier. |
| 812,516 (now U.S. 3,619,414, issued 11-9-71) | 2-19-69 | Catalytic Hydrofinishing of Petroleum Distillates in the Lubricating Oil Boiling Range—Ivor W. Mills, Merritt C. Kirk, Jr., and Albert T. Olenzak. |
| 823,138 (now U.S. 3,560,578, issued 2-2-71) | 5-8-69 | Reaction for Linking Nuclei of Adamantane Hydrocarbons—Abraham Schneider. |
| 850,717 (now abandoned) | 8-18-69 | Hydrorefined Lube Oil and Process of Manufacture—Ivor W. Mills and Glenn R. Dimeler. |
| 851,488 (abandoned 9-8-70) | 8-19-69 | Reaction of Alkyladamantane Compounds to Form Products Having Two Linked Adamantane Nuclei—Robert E. Moore and Abraham Schneider. |
| 3,256 (now U.S. 3,684,551, issued 3-14-72) | 8-19-69 | Friction or Tractive Drive Fluid—Irl N. Duling, David S. Gates, and Robert E. Moore. |
| 876,993 (now U.S. 3,645,902, issued 2-29-72) | 11-14-69 | Friction or Tractive Drive Fluid Comprising Adamantanes—Irl N. Duling, David S. Gates, Robert E. Moore, and Frederick P. Glazier. |
| 877,462 (abandoned 4-19-71) | 11-17-69 | Combination of Traction Drive and Traction Fluid Comprising Saturated Cyclic Compounds—Irl N. Duling, and Frederick P. Glazier. |
| 28,942 | 4-15-70 | Process for Producing Polyisobutylene Oil—Alfred E. Hirschler and Gary L. Driscoll. |
| 33,023 (abandoned 11-7-71) | 4-29-70 | Combination of Tractive Drive and Traction Fluid Comprising Cyclic or Acyclic Compounds—Irl N. Duling and Frederick P. Glazier. |
| 52,772 | 7-6-70 | Preparation of Oils from Isobutene—Gary L. Driscoll. |
| 52,268 (now abandoned, 7-23-71) | 7-6-70 | Phosphorous Compound Promoted Oligimerization of Isobutene—Gary L. Driscoll. |
| 52,773 | 7-6-70 | Oligimerization of Isobutene and α-Methylstyrene—Gary L. Driscoll and David L. Kerr. |
| 552,771 (now abandoned, 8-17-71) | 7-6-70 | Polymerization of Dialkyl Vinylidene Compounds of Oils—Gary L. Driscoll. |
| 52,300 | 7-6-70 | Branched Hydrocarbons in the $C_{16}$–$C_{40}$ Range Having Maximally Crowded Geminal Methyl Groups—Gary L. Driscoll, Irl N. Duling, David S. Gates, and Robert W. Warren. |

The disclosure of all of the above-referred to applications is hereby incorporated herein by reference, particularly as to disclosure therein directed to the preparation of polyolefin oils, of compounds containing one or more thermally cracking of high molecular weight polyisobutylene have physical properties different from those of commercial isobutylene oligomers. In particular, the "Duling-Gates" fluids, prepared by thermal cracking, had much better viscosity-temperature properties (including ASTM VI's in the range of 95–115). It has been found that these Duling-Gates Oils consist essentially of odd-numbered and even-numbered species in the carbon number series $C_{11}$, $C_{12}$, $C_{15}$, $C_{16}$ . . . $C_{39}$, $C_{40}$.

The present application is in part directed to a novel polyisobutylene oil consisting essentially of "regular" structured "polyisobutylene units" and containing only very minor amounts of the odd-numbered species which are present in the "Duling-Gates" oils prepared by thermally cracking high molecular weight polyisobutylene. Other novel oils containing acyclic paraffin hydrocarbons can be prepared by hydrogenation (preferably to a Br No. less than 10 and more preferably less than 5) of these novel polybutene oils. Certain of these novel polyolefin oils can also be prepared by the process of the above-referred to application of Hirschler and Driscoll. The polyisobutylene oils of the present invention consist essentially of true isobutylene oligomers. In fact, they can consist almost entirely of monoolefins in the $C_{16}$–$C_{48}$ range having the following structures, identified as ($A_1$), ($A_2$), ($A_3$), ($B_1$), and ($B_2$):

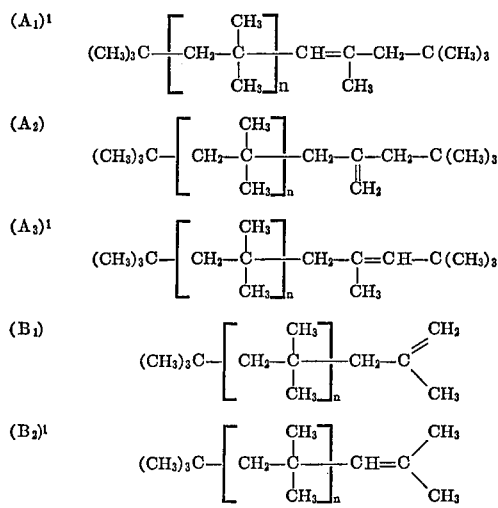

[1] Probably both cis and trans forms.

DESCRIPTION OF THE DRAWINGS

In the accompanying drawings.

FIG. 2 is a typical vapor phase chromatogram, in the $C_{16}$–$C_{32}$ region, of a novel polyisobutene oil of the present invention, and, by nearly baseline resolution (the broken line is the base line), indicates the very minor content therein of cracked, isomerized or other non-isobutene oligomer species.

Figure 1A:
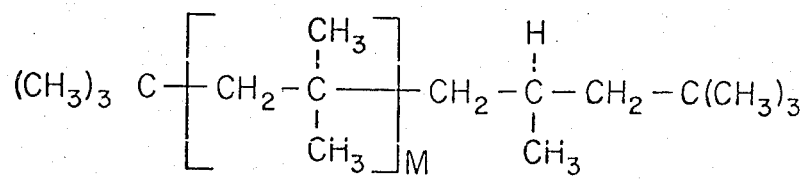
FIG. 1 presents the structural formulae (where N and M are integers) of the seven paraffin hydrocarbon species (in the $C_{16}$–$C_{48}$ range) which can be identified in the chromatograms of FIGS. 2–7. A and B of FIG. 1 are the two isomers which are predominant in hydrogenated polyisobutylene oils of the present invention.
Figure 1B:
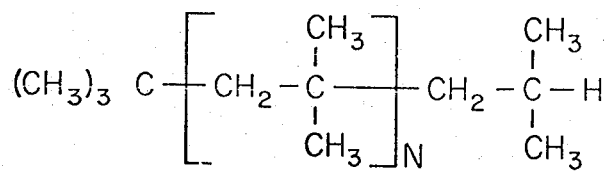
Figure 1C:
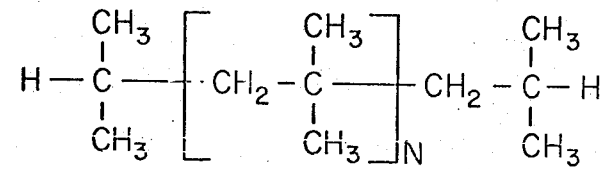
Figure 1D:
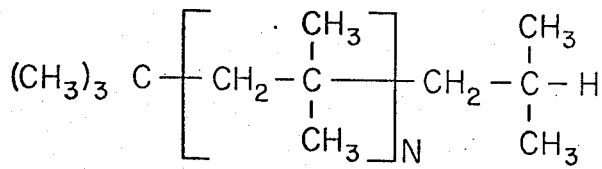
Figure 1E:
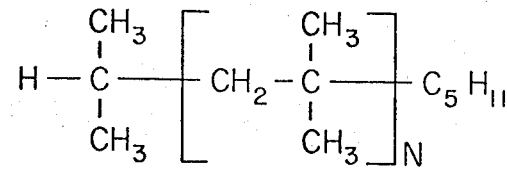
Figure 1F:
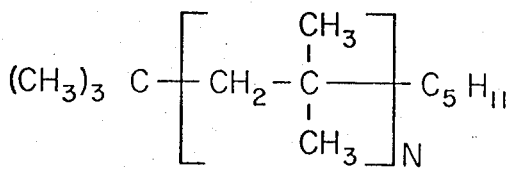
Figure 1G:
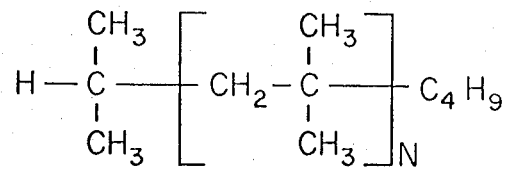
Figure 3:
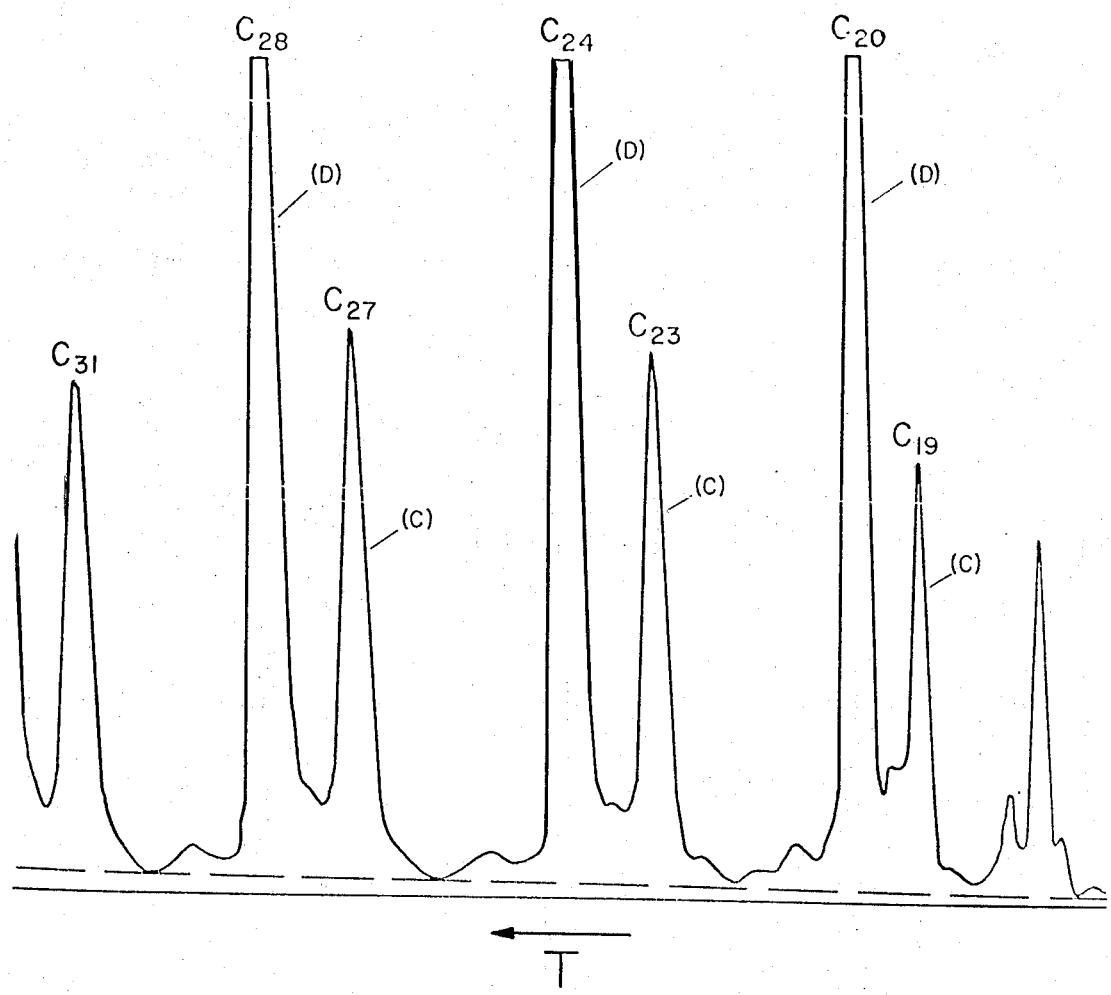
FIG. 3 is a typical vapor phase chromatogram of a hydrogenated "Duling-Gates oil," preferred by thermal cracking (or "unzipping"), under vacuum, of a high molecular weight polyisobutene gel. This figure shows the presence of adjacent odd and even carbon number species (e.g. $C_{19}$, $C_{20}$) and, by nearly base line resolution shows the virtual absence of species of other carbon number (e.g. $C_{21}$, $C_{22}$) or of species produced by isomerization of the true isobutene units.
Figure 4:
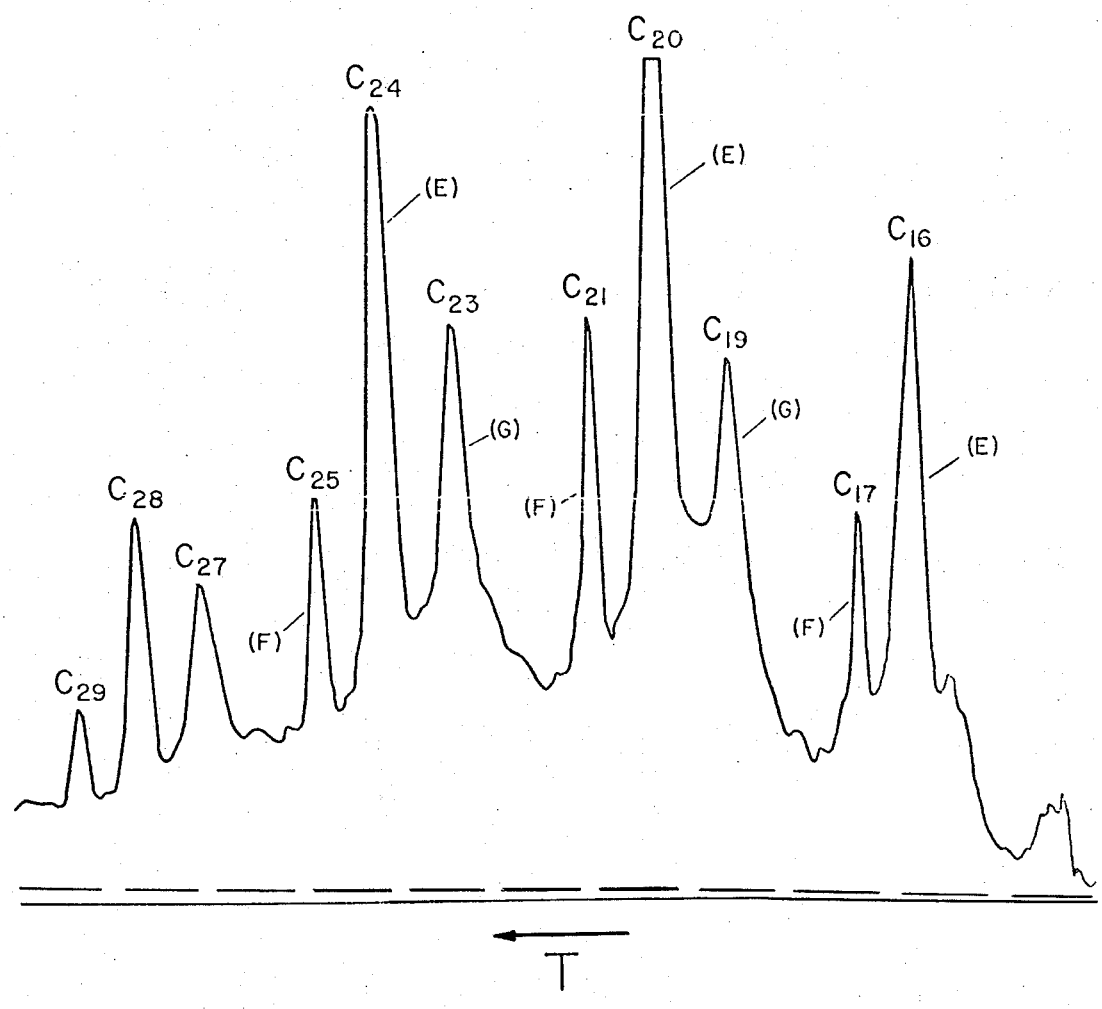

As is further disclosed in the previously cited application of Driscoll, Duling, Gates and Warren, the odd and even carbon number species in the oils of FIGS. 2 and 3 are unique species, characterized by maximally "crowded" and sterically hindered geminal methyl and isolated methylene groups.

Figure 5:
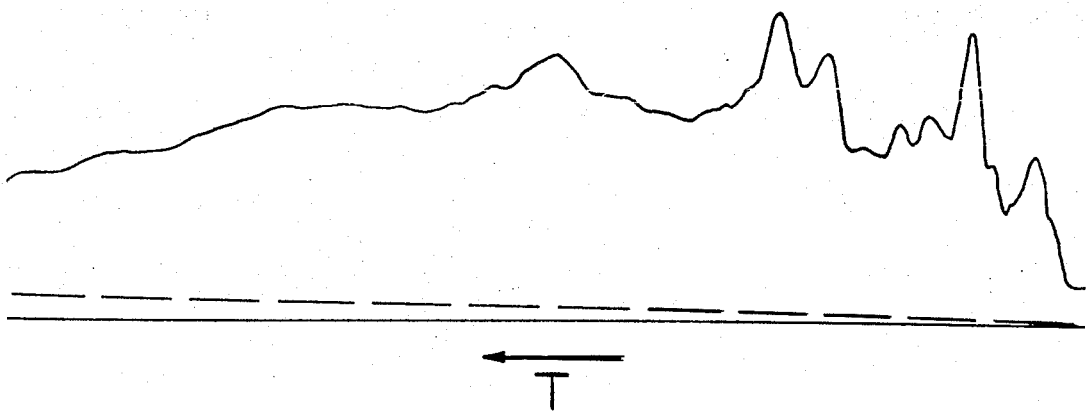
Figure 6:
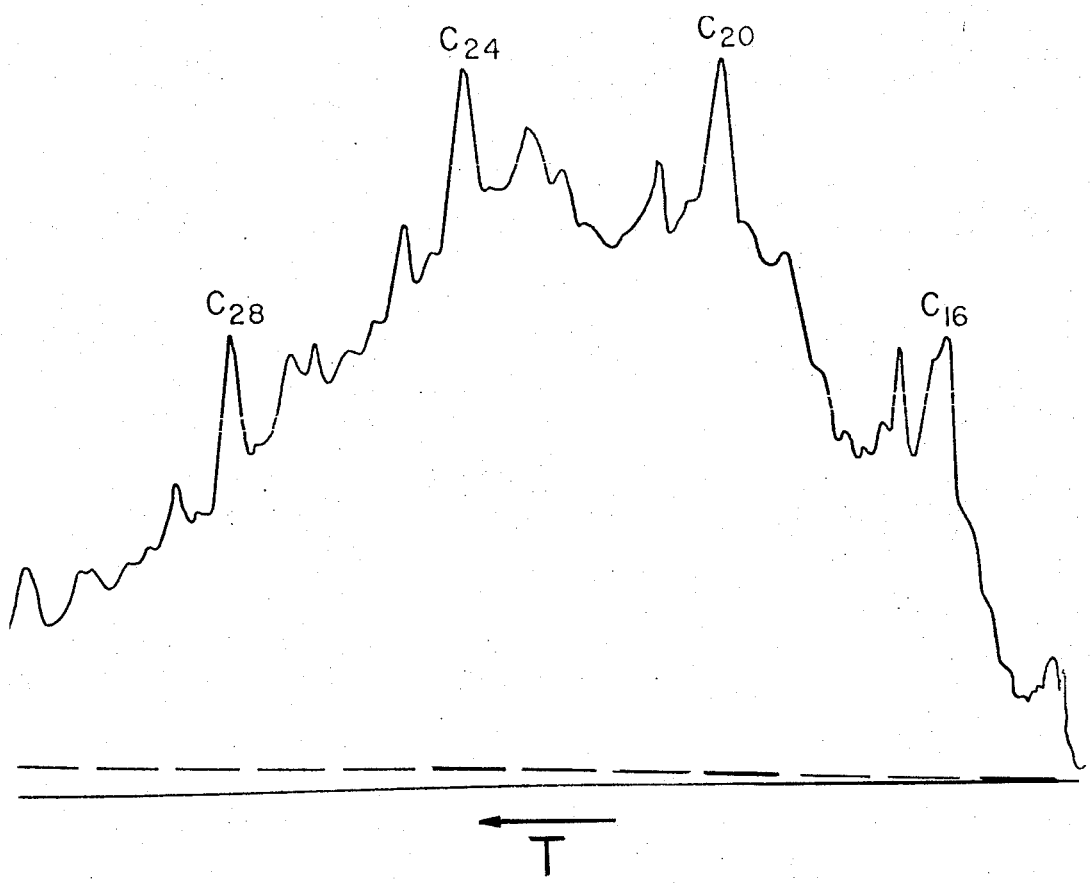
Figure 7:
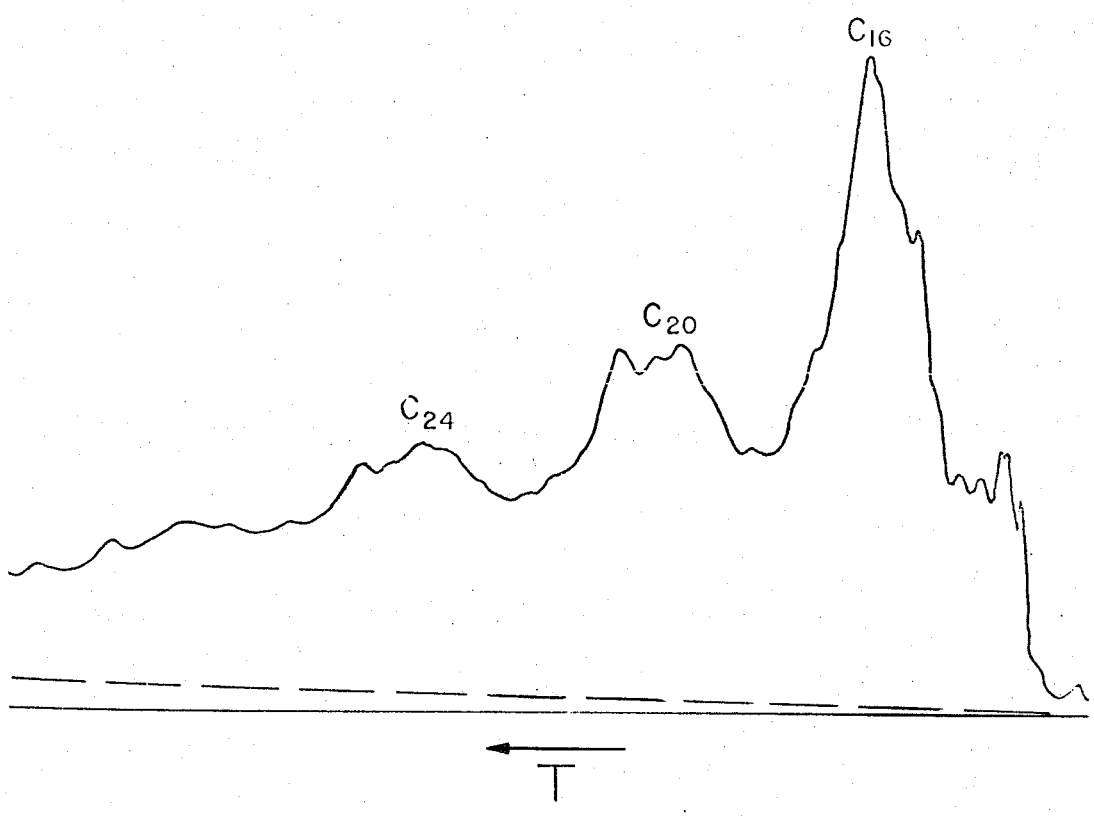

FIGS. 4–7 are vapor phase chromatograms of commercially available polybutene oils and show that such oils do not consist essentially of true oligomers of isobutene but contain appreciable amounts of virtually all of the carbon number species which could be present within the carbon number range of the oil. For example, the oil of FIG. 4 produced distinct VPC peaks within the $C_{16}$–$C_{29}$ range which could be identified as $C_{16}$, $C_{17}$, $C_{19}$, $C_{20}$, $C_{23}$ etc. This oil also had far from base line resolution (i.e., an "envelope"), thus, indicating the presence of many isomeric forms of the other possible carbon number species (e.g. $C_{18}$, $C_{22}$, $C_{26}$). Similarly, the chromatograms of FIGS. 5, 6 and 7 show the presence of large amount of "non-isobutylene oligomers."

FURTHER DESCRIPTION

The novel polyolefin and hydrogenated polyolefin oils described herein are useful as traction fluids, or as components of traction fluids. The novel polyolefin oils or the individual olefins therein are also useful as chemical intermediates to prepare novel polar components (such as alcohols, acids, esters, ketones, thioketones, amides, amines, thioesters, phosphate esters of the alcohols and thioesters). The ketones, and other nonacidic ozonolysis products can be useful as traction fluids or as components of traction fluids. Such derivatives, and their use as traction fluids or as antiwear additives in lubricants are the invention of Gary L. Driscoll and Marcus W. Haseltine, Jr., and are the subject of a number of later-filed applications including Ser. No. 135,295, filed Apr. 19, 1971, Ser. No. 144,165 filed May 17, 1971 (now U.S. 3,715,313, issued Feb. 6, 1973) and Ser. No. 152,303, filed June 11, 1971.

One of the processes for preparation of said ozonolysis products involves mixing the polyolefin oil with about 3 volumes of acetic acid or methanol and adding ozone thereto. The reaction can be effected in the range of —80–100° C. (preferably 0–80° C.). The amount of ozone can be about one molecule of ozone per each double bond in the oil. After reaction of the double bond with the ozone, an excess of water or hydrogen peroxide is added to hydrolyze the ozonolysis products. About one volume of water per volume of oil is sufficient to produce a mixture comprising acids and ketones.

The novel polyisobutylene and hydrogenated polyisobutylene oils of the present invention have a higher viscosity index (usually at least 10% higher) than oils of the same viscosity at 210° F. prepared from polyisobutylene by prior art techniques. Although the present invention includes oils consisting essentially of isobutene oligomers in the $C_{12}$–$C_{48}$ carbon number range, the more preferred polyisobutene oils of the present invention, have a viscosity index in the range of 90–130 and consist essentially of true polyisobutene oligomers in the 20–40 carbon number range. This property of these oils is more fully discussed in U.S. application Ser. No. 52,300, entitled "Branched Hydrocarbons in the $C_{16}$–$C_{40}$ Range Having Maximally Crowded Geminal Methyl Groups," filed by Gary L. Driscoll, Irl N. Duling, David S. Gates and Robert W. Warren on even date herewith. As used herein viscosity index (unless specified as "ASTM") refers to Viscosity Temperature Function Viscosity Index (VTF-VI) as determined by the technique of W. A. Wright as set forth in ASTM Bulletin #215, 84 (1956). This value is similar to that obtained by ASTM D2270 which is reported herein as ASTM-VI.

The previously cited applications of Driscoll and of Driscoll and Kerr, relate to the proper selection of solvent and catalyst which produces oligomers of the olefin starting material with a minimum of the disproportionation and isomerization that are found in oils of the prior art processes. The solvent serves as a polar solvent to solvate the intermediate carbonium ions formed during the reaction, and to complex the catalyst to give a catalytically active species which remains in the solvent phase. The nitromethane and nitroethane also dissolves appreciable amounts of monomer but little of the oils. This last property is believed to be partly resonsible for the narrow molecular weight distribution obtained in the product when using these preferred solvents, which results in a more favorable product distribution. Suitable solvents for meeting the requirements for this purpose have been found to be nitromethane, nitroethane, nitropropane, nitrobenzene, benzene, lower alkyl benzenes, and mixtures thereof. Suitable lower alkyl benzenes include toluene, the xylenes, and ethyl benzene. Of these, nitro compounds are preferred (with nitroethane being the especially preferred solvent). Reasonable yields of polyisobutylene oils having $KV_{210}=1.5-20$ and $VTF-VI=95-115$ can be prepared.

The preferred process for the preparation of these fluids involves the use of anhydrous stannic chloride as catalyst and nitromethane (or nitroethane) as solvent.

The catalyst used in the preferred process (for making oils having an average molecular weight up to about 1000) is stannic chloride. The stronger Lewis acid catalysts such as aluminum chloride, aluminum bromide, titanium tetrachloride, and antimony pentachloride do not cause any appreciable polymerization of the monomers in nitromethane. Boron trifluoride in nitromethane gives an oil product from isobutene having a viscosity index of about 75. Stannic chloride does not catalyze the polymerization of these monomers satisfactorily in such solvents as ether, water, dioxane, acetic acid, acetone, acetonitrile, acetic anhydride, diethylene glycol monoethyl ether, chloroform, methyl acetate, dimethoxyethane, N-methyl-pyrrolidone, and hexamethylphosphoramide.

This system is operated at low pressure near ambient temperature, gives high ratios of product to catalyst consumed, is highly selective for isobutylene while tolerating a wide variety of feed compositions, is easily controlled to give the desired products, and is well suited for continuous recycle operation.

Product isolation involves simple phase separation. The product distribution is sufficiently narrow that simple vacuum topping is required so no heavy by-productions are formed. By-product dimer, trimer and tetramer have some commercial uses and are also readily cracked to isobutylene for recycle.

The most important reaction variables are the temperature and the rate of feed relative to the amount of catalyst present (which determines the reaction rate).

In general the temperature can be varied from $-30°$ C. to $+100°$ C. with from $-30°$ C. to $50°$ C. being the preferred range and $0°$ to $35°$ C. being an especially preferred range. Electrical oils are generally obtained at lower temperature than those used in obtaining tractants. The volume of oil prepared is generally at least equal to the volume of solvent for a given run but the ratio of volume of oil prepared to volume of solvent present may easily exceed 10:1. When carrying out the process in a continuous operation by continuously removing the reaction medium and separating the product from the catalyst and solvent; the ratio of solvent to product generally is maintained at from 2:1 to 1:2.

The catalyst may be used in an amount equal from 0.1 to 40 volume percent of the solvent present, and preferably from 1 to 20 volume percent of the solvent present.

The concentration of the free monomer in the reaction medium is relatively small and can be controlled by the pressure maintained at given temperature for gaseous feeds and by rate of addition for liquid olefin feeds thus controlling the molecular weight of the product. Generally pressures of from about 1 to 275 p.s.i. absolute have been found most suitable with from 10 to 100 p.s.i.a. being the preferred range.

The feed stock can vary from 5 to 100% monomer (i.e. isobutylene), the remainder being any inert hydrocarbons. The presence of hydrocarbon non-vinylidene compounds, is not detrimental since the vinylidene monomers as defined herein are selectively polymerized by the catalyst system. For instance the efficiency of isobutene removal from mixtures of isobutene and other butenes and/or butanes depends on the particular process is relatively insensitive to small amounts of impurities such as air, water, organosulfur or organo-nitrogen compounds.

Distillation to produce different oil compositions can give varying results depending on the vacuum, the apparatus, the distillation rate and the composition of the reaction product which is distilled. Under some conditions, considerable (>15%) trimer can be left when the oil is topped to $80°$ C., under other conditions little (<10%) of the trimer or tetramer will remain. More typically ⅓ of the tetramer remains in the oil, and 2.3 of the tetramer and nearly all of the trimer are removed. In addition, distillation is inherently limited by the thermal stability of the oil. At temperatures (of the overhead distillate) from 175 to 225° C. cracking of the can become so severe that the pressure starts to increase (usually the pressure is less than 1.0 mm. Hg).

Vapor phase chromatograph (VPC) scans give good information on the relative amounts of dimer, trimer, etc. up to about $C_{48}$.

The oils produced by the process may have a number average molecular weight of from 224 to about 2,000. The preferred product contains principally the tetramer to decamer range. The tetramer in the present case consists predominantly of a major and a minor component. In the case of isobutene the hydrogenated major tetramer component has the structure:

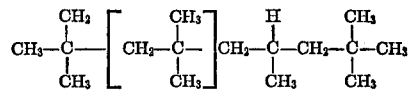

and the minor component has the structure:

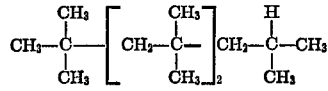

This latter type of structure predominates above the tetramer i.e. at pentamer and above. The repeating unit for components of the pentamer and higher oligomers is indicated by the brackets in the formulae. The higher olefins such as 2-methylbutene-1 produce the corresponding regular structures when oligomerized in accordance with the previously process monomers suitable for use in preparing such oils.

"Vinylidene" monomers suitable for preparing novel, "unisomerized" oligomer oils, by the process described herein, have the formula:

wherein —R is —$CH_3$ or —$C_2H_5$ and $R^1$ is an alkyl group of from 1 to 10 carbon atoms.

These oligomers are useful in the "as produced" unsaturated forms as electrical oils. When the oils are to be used as traction fluids they may be hydrogenated using a conventional hydrogenation catalyst such as Raney nickel, platinum, palladium or rhodium to improve the oxidative stability thereof. However, the olefinic oils are relatively stable and do not require further treatment in order for them to be suitable for use as traction fluids. For most uses such as traction fluid the higher molecular weight product may be left with the tetramer to decamer range material, but the dimers and trimers should be separated therefrom along with the monomer. This is readily accomplished by distillation.

The oils as produced by the present process find particular advantage in their use as traction fluids (particularly in blends with the saturated cyclic compounds disclosed in Ser. No. 33,023) due to their high coefficients of traction and excellent viscosity-temperature properties. The requirements of a traction fluid are discussed in the U.S. Pats. Nos. 2,549,377; 3,440,894; and 3,411,369. Exemplary tractive devices in which the traction fluids of the present invention find use are disclosed in U.S. Pats. Nos. 1,867,553; 2,871,714; 3,006,206; and 3,184,990.

Additionally these oils find use in caulks and as reactants, electrical oils, etc.

ILLUSTRATIVE EXAMPLES

Example 1

Nitromethane (200 ml.) and $SnCl_4$ (5 ml.) are stirred in a three-necked, round-botomed flask (500 ml.) equipped with a gas inlet tube, mechanical stirrer, reflux condenser, external bath and thermometer, while isobutene is passed into the mixture kept at 36° C. The isobutene is fed to the flask at a rate sufficient to maintain no flow on the outlet side after air has been swept from the flask. After 26 min. the isobutene flow is stopped and the contents of the flask transferred to a separatory funnel. Conversion of the isobutene is quantitative. After allowing five minutes for phase separation, the nitromethane layer (202 ml.) is drained from the bottom of the funnel. In accordance with standard practice the oil layer (235 ml.) is washed twice with saturated aqueous sodium chloride solution, once with 5% aqueous sodium hydroxide solution and twice more with saturated aqueous sodium chloride solution. The oil layer is then dried over anhydrous calcium chloride and placed in a vacuum distillation apparatus. It is distilled to remove all material boiling below 80° to 0.5 mm. Hg. The remaining oil fraction (100 ml.) has the following properties:[1] $KV_{210° F.}=4.25$ cs., $KV_{100° F.}=22.42$ cs., VTF-VI=98, ASTM-VI=104. The distillate (100 ml.) was approximately (by VPC) 49% trimer and 49% tetrameter. Any dimer would have been lost to the trap (10 ml.). The loss on batch drying is about 30 ml.

Example 2

Example 1 was repeated except that the oil was distilled, collecting as the oil fraction the portion boiling from 80–200° C. This had the following properties: $KV_{210° F.}=3.23$ cs., $KV_{100° F.}=14.09$ cs., VTF-VI=105, ASTM-VI=104. This illustrates that the high viscosity index of the product is not due to a wide blending range of product molecular weight.

Example 3

A polymerization is carried out as in Example 1 except that the reaction temperature is maintained at 25° C. Again, 235 ml. of product is obtained in 26 min. The distillation gives 33 ml. of low boiling distillate (40% trimer, 57% tetramer) and 188 ml. remaining oil. This oil is percolated through about 12 in. of a column packed with activated alumina. The resulting oil is completely clear and has the following properties: $KV_{210° F.}=13.56$ cs., $KV_{100° F.}=145.2$ cs., VTF-VI=96, ASTM-VI=96.

The invention claimed is:

1. An oil consisting essentially of at least four members selected from at least one of the groups consisting of the branched olefin and paraffin hydrocarbons having 16, 20, 24, 28, 32, 40, 44 or 48 carbon atoms, said hydrocarbon having the formula:

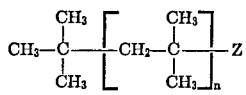

wherein $n$ is an integer from 3 to 11 inclusive, and wherein Z is:

(A)

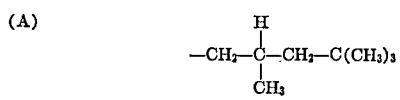

or

H when said hydrocarbon is a paraffin, and Z is:

(B) 

or

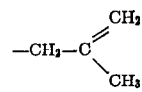

or

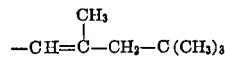

or

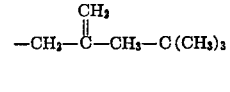

or

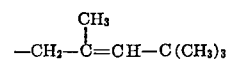

when said hydrocarbon is an olefin.

2. An oil according to claim 1 wherein said oil contains less than 10 weight percent of olefin or paraffin hydrocarbons which do not have said formula.

3. An oil according to claim 1 wherein a vapor phase chromatogram of said oil in the $C_{16}$ to $C_{32}$ carbon number region shows nearly base line resolution and is free of any significant envelope and peaks produced by hydrocarbons which do not correspond to said formula.

4. An oil according to claim 1 having a bromine number less than 10.

5. An oil according to claim 1 and having a $KV_{210}$ in the range of 1.5–20 and a VTF-VI in the range of 95–115.

6. An oil according to claim 3 wherein said peaks of said chromatogram which do not correspond to said formula are no greater than indicated in FIG. 2 hereof, said oil having a $KV_{210}$ of about 3.86, $KV_{100}$ of about 18.1, and a VTF-VI of about 111.

7. An oil according to claim 3 wherein said members and the relative proportion of said members, in the $C_{16}$ to $C_{32}$ region is substantially as shown in FIG. 2 hereof.

8. An oil according to claim 7 and having a bromine number less than 5.

9. An oil consisting essentially of at least four members selected from at least one of the groups consisting of the branched paraffin hydrocarbons having 16, 20, 24, 28, 32, 40, 44 or 48 carbon atoms, said hydrocarbon having the formula:

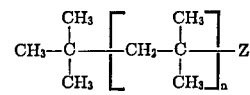

wherein $n$ is an integer from 3 to 11 inclusive, and wherein Z is:

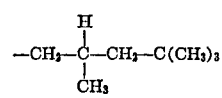

or

H

10. An oil according to claim 9 wherein said oil contains less than 10 weight percent of olefin or paraffin hydrocarbons which do not have said formula.

11. An oil according to claim 9 wherein a vapor phase chromatogram of said oil in the $C_{16}$ to $C_{32}$ carbon number region shows nearly base line resolution and is free of any significant envelope and peaks produced by hydrocarbons which do not correspond to said formula.

12. An oil according to claim 9 and having a bromine number less than 5.

---

[1] As used herein KV stands for kinematic viscosity as determined by ASTM D445.

13. An oil according to claim 9 and having a $KV_{210}$ in the range of 1.5–20 and a VTF-VI in the range of 95–115.

14. An oil according to claim 9 wherein said four members are consecutive.

References Cited
UNITED STATES PATENTS

| | | | |
|---|---|---|---|
| 3,666,827 | 5/1972 | Carlson et al. | 260—67.6 |
| 2,403,779 | 7/1946 | Bailey | 260—683.15 B |
| 2,085,535 | 6/1937 | Langedjk et al. | 260—683.15 B |
| 2,076,201 | 6/1937 | Langedjk et al. | 260—683.15 B |
| 3,576,898 | 4/1971 | Blake et al. | 260—676 |
| 2,830,106 | 4/1958 | Good et al. | 260—683.15 |
| 3,156,736 | 11/1964 | Southern et al. | 260—683.15 |
| 3,501,546 | 3/1970 | Dubeck et al. | 260—676 |
| 3,476,803 | 11/1969 | Pine | 260—526 |
| 3,586,734 | 6/1971 | Ryu et al. | 260—683.15 D |
| 3,505,424 | 4/1970 | Wulf | 260—677 |

DELBERT E. GANTZ, Primary Examiner

J. M. NELSON, Assistant Examiner

U.S. Cl. X.R.

208—19; 260—683.15